(12) United States Patent
Sugumar et al.

(10) Patent No.: US 11,741,319 B2
(45) Date of Patent: Aug. 29, 2023

(54) CONFIGURATION OF BUILDING AUTOMATION SYSTEM CONTROLLERS USING NEAR FIELD COMMUNICATION

(71) Applicant: Carrier Corporation, Palm Beach Gardens, FL (US)

(72) Inventors: Mohan Sugumar, Tamilnadu (IN); Rohitkumar Gordhanbhai Savaliya, Vadodara (IN); Saurav Girepunje, Abhanpur (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 326 days.

(21) Appl. No.: 17/128,854

(22) Filed: Dec. 21, 2020

(65) Prior Publication Data
US 2021/0334483 A1 Oct. 28, 2021

(30) Foreign Application Priority Data
Apr. 27, 2020 (IN) .............................. 202041017861

(51) Int. Cl.
| H04L 29/06 | (2006.01) |
| G06K 7/10 | (2006.01) |
| G06K 19/07 | (2006.01) |
| H04L 9/06 | (2006.01) |
| H04L 9/08 | (2006.01) |

(52) U.S. Cl.
CPC ..... G06K 7/10009 (2013.01); G06K 19/0723 (2013.01); H04L 9/0643 (2013.01); H04L 9/0819 (2013.01)

(58) Field of Classification Search
CPC ............ G06K 7/10009; G06K 19/0723; H04L 9/0643; H04L 9/0819; H04L 63/0428; H04L 63/0435; G06F 21/57; G06F 21/62; G06F 21/6209
See application file for complete search history.

(56) References Cited

U.S. PATENT DOCUMENTS

| 10,382,268 B1* | 8/2019 | Meyer ..................... G06F 21/57 |
| 2010/0156639 A1* | 6/2010 | Herwig .................. G07G 1/009 340/572.1 |
| 2014/0365782 A1* | 12/2014 | Beatson ................. G06V 40/50 713/186 |
| 2015/0017910 A1* | 1/2015 | Li ......................... H04B 5/0056 455/41.1 |
| 2017/0082993 A1* | 3/2017 | Narain .................... H04W 4/33 |
| 2018/0150256 A1* | 5/2018 | Kumar .................... G06F 21/73 |
| 2018/0150410 A1* | 5/2018 | Dimer .................... G06F 21/606 |
| 2018/0302217 A1* | 10/2018 | Hevia Angulo ........ H04L 9/085 |
| 2020/0007542 A1* | 1/2020 | Maierean ............ H04L 63/0428 |
| 2020/0380141 A1* | 12/2020 | Wang .................. G06F 21/6218 |

* cited by examiner

*Primary Examiner* — Malcolm Cribbs
(74) *Attorney, Agent, or Firm* — Kinney & Lange, P. A.

(57) ABSTRACT

Generating configuration parameters for a controller includes receiving, by a mobile computing device, identity information associated with the controller via Near Field Communication (NFC) read operations from memory of a NFC tag associated with the controller. The mobile computing device generates one or more configuration parameters for the controller based on the received identity information associated with the controller. The mobile computing device further stores, via NFC write operations, the configuration parameters in the memory of the NFC tag for later retrieval and configuration operations by the controller.

17 Claims, 8 Drawing Sheets

CONFIGURATION OF BUILDING AUTOMATION SYSTEM CONTROLLERS USING NEAR FIELD COMMUNICATION

BACKGROUND

The present disclosure relates generally to building automation systems (BAS), and more specifically to the configuration of BAS controllers using Near Field Communication (NFC) techniques.

Building automation systems (BAS) are used to manage and automate the control of various environmental, physical, and electrical building subsystems. In particular, BAS systems are often used for the coordination and control of heating, ventilation and air conditioning (HVAC) and climate control systems, but are also frequently used for security systems, lighting systems, and other connected building subsystems.

BAS systems typically leverage a series of interconnected controller devices that coordinate the control and automation of such subsystems. Large-scale BAS systems can include hundreds, or even thousands of controllers.

Configuration and commissioning of the BAS controllers, however, typically requires a team of service engineers to physically connect with each BAS controller (e.g., using a wired Ethernet or other wired connection) via a laptop or other computer device to initialize each BAS controller with, for example, wireless communication parameters and numerous other configuration parameters that define communicative and other operational characteristics of the controllers. Accordingly, conventional techniques for configuring and commissioning BAS controllers for operation often require a significant outlay of service engineering resources, thereby increasing the time and expense associated with the installation and maintenance of BAS systems.

SUMMARY

In one example, a method for generating configuration parameters for a controller comprises receiving, by a mobile computing device, identity information associated with the controller via Near Field Communication (NFC) read operations from memory of a NFC tag associated with the controller. The method further comprises generating, by the mobile computing device, one or more configuration parameters for the controller based on the received identity information associated with the controller, and storing, by the mobile computing device via NFC write operations, the configuration parameters in the memory of the NFC tag for later retrieval and configuration operations by the controller.

In another example, a controller includes one or more processors, computer-readable memory, a Near Field Communication (NFC) transceiver, and a NFC tag. The NFC tag includes NFC memory that stores identity information corresponding to the controller. The computer-readable memory of the controller is encoded with instructions that, when executed by the one or more processors, cause the controller to retrieve, via the NFC transceiver, configuration parameters stored in the NFC memory, and configure the controller using the retrieved configuration parameters.

In another example, a method of configuring a controller includes storing, in memory of a NFC tag associated with the controller, identity information corresponding to the controller. The method further includes retrieving, by the controller after transition of the controller from a powered-off state to a powered-on state, encrypted configuration parameters stored in the memory of the NFC tag, and generating, by the controller, a symmetric key based on the identity information corresponding to the controller. The method further includes decrypting, by the controller using the symmetric key, the encrypted configuration parameters retrieved from the memory of the NFC tag to produce decrypted configuration parameters, and configuring the controller according to the decrypted configuration parameters.

DETAILED DESCRIPTION

According to techniques of this disclosure, configuration parameters for a building automation system (BAS) controller are generated by a mobile computing device utilized by a service engineer or other technician. The configuration parameters are stored in memory of a Near Field Communication (NFC) tag associated with the BAS controller for later retrieval and configuration operations performed by the controller. The techniques described herein provide secure and reliable NFC communications between the mobile computing device and the BAS controller, as well as the ability to automatically determine such configuration parameters based on identity information associated with the controller that is stored in the memory of the NFC tag. Moreover, the use of passive NFC tag technologies enables the configuration parameters to be determined and stored in the memory of the NFC tag while the BAS controller is in a powered-off state, thereby increasing flexibility of scheduling for commissioning operations associated with the controller. The techniques of this disclosure can therefore decrease the time and corresponding cost associated with the commissioning of BAS controllers.

Figure 1:
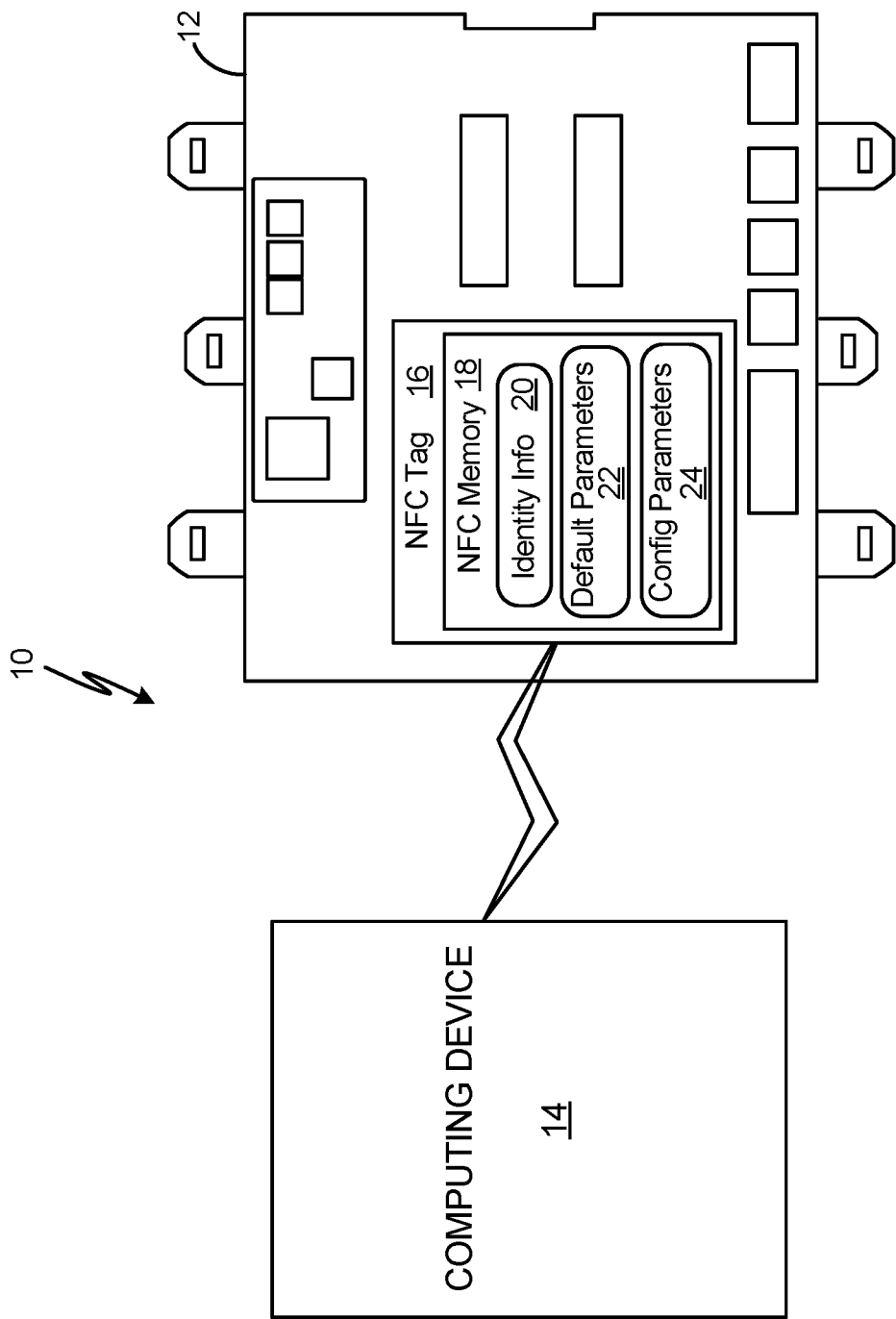
FIG. 1 is a block diagram illustrating an example system including a building automation system (BAS) controller having a Near Field Communication (NFC) tag and a mobile computing device that communicates with the NFC tag to generate and store configuration parameters for the controller.

FIG. 1 is a block diagram illustrating example system 10 that includes BAS controller 12 and computing device 14. As illustrated in FIG. 1, BAS controller 12 includes NFC tag 16 associated therewith. For instance, NFC tag 16 can be integrated with computer-readable memory of BAS controller 12, attached to BAS controller 12 (e.g., adhesively or otherwise attached to an interior or exterior of a housing of BAS controller 12), or otherwise associated with BAS controller 12. As further illustrated in FIG. 1, NFC tag 16 includes NFC memory 18 that stores identity information 20, default configuration parameters 22, and configuration parameters 24.

BAS controller 12 can be one of a plurality of BAS controllers, each electrically and/or communicatively coupled with one or more BAS subsystems and/or components (not illustrated), such as heating, ventilation and air conditioning (HVAC) components, security system components, lighting system components, or other building subsystems and/or components. As such, though the example of FIG. 1 is illustrated and described with respect to a single BAS controller (i.e., BAS controller 12 in this example), it should be understood that the techniques described herein are applicable to a system that includes multiple BAS controllers, such as tens, hundreds, thousands, or other numbers of BAS controllers.

NFC tag 16, associated with BAS controller 12, includes radio frequency (RF) antenna and other circuitry (not illustrated) for communicating via NFC read and write operations with a NFC transceiver within range, such as a range of, e.g., 20 centimeters (7.87 inches) or less. NFC tag 16 can be a passive NFC tag that draws power via magnetic induction from an active device within range, such as via a NFC signal produced by a NFC transceiver of computing device 14. As such, as is further described below, NFC tag 16 can enable the transfer of data between NFC memory 18 and a NFC transceiver of computing device 14 even when BAS controller 12 is in a powered-off state.

Computing device 14, as illustrated in FIG. 1, is remote from (i.e., physical remote from) BAS controller 12, and includes a NFC transceiver that communicates wirelessly with BAS controller 12 for generating and storing configuration parameters corresponding to BAS controller 12 within NFC memory 18. Examples of computing device 14 can include, but are not limited to, a portable or mobile device such as a laptop computer, a tablet computer, a smartphone, a personal digital assistant (PDA), or other mobile computing device that includes at least one NFC transceiver capable of communicating via NFC read and write operations with NFC tag 16.

In operation, identity information 20 corresponding to BAS controller 12 is stored in NFC memory 18 during, e.g., manufacturing or other pre-commissioning activities. For instance, identity information 20 can be stored in NFC memory 18 by BAS controller 12, such as via a NFC transceiver of BAS controller 12, or via a NFC transceiver of a remote device, such as a smartphone, laptop computer, tablet computer, or other NFC programmer at a manufacturing or other production facility. Identity information 20 can include, e.g., any one or more of a media access control (MAC) address of BAS controller 12, a MAC address of a wireless transceiver of BAS controller 12, a serial number (e.g., a unique serial number) of BAS controller 12, a firmware or other software version number associated with BAS controller 12, or other identity information associated with BAS controller 12.

In some examples, such as the example of FIG. 1, default configuration parameters 22 can also be stored in NFC memory 18, such as via a NFC transceiver of BAS controller 12 or a remote computing device during the manufacturing or other pre-commissioning activities. Examples of default configuration parameters 22 can include, e.g., default Attached Resource Computer Network (ARCNET) baud rate, default BACnet Master-Slave Token Passing (MSTP) baud rate, default Modbus baud rate, default Modbus mode, default Modbus slave address, default Modbus inter packet time, default Modbus inter character time, default Modbus response time, default device location information, or other default configuration parameters. In certain examples, as is further described below, default configuration parameters 22 can be stored in NFC memory 18 in an encrypted state after encryption via a symmetric key that is derived using identity information 20 (and, in certain examples, a private key), thereby enhancing security of the communications between computing device 14 and BAS controller 12. In yet further examples, default configuration parameters 22 and/or identity information 20 can be stored in NFC memory 18 in combination with a data integrity value that is derived from identity information 20 and/or default configuration parameters 22, thereby enabling detection of corrupted data and enhancing reliability of the NFC communications.

In a typical installation, BAS controllers are delivered to the installation location and installed (e.g., physically installed) prior to completion of electrical and other building subsystems. As such, BAS controller 12, including NFC tag 16, can be transported to the delivery location and installed while BAS controller 12 is in a powered-off state (i.e., not electrically powered). Rather than require that the determination of configuration parameters and other associated commissioning activities wait until electrical power is available and delivered to BAS controller 12, techniques of this disclosure enable configuration parameters to be determined and stored in NFC memory 18 while BAS controller 12 is in the powered-off state.

For instance, as is further described below, a service engineer or other technician can utilize computing device 14 to generate and store configuration parameters 24 in NFC memory 18 while BAS controller 12 is in the powered-off state (e.g., installed at the final destination and in the powered-off state). For example, computing device 14, when within range for NFC communications (e.g., when placed within range for NFC communications by the service engineer), can retrieve identity information 20 via NFC read operations initiated by a NFC transceiver of computing device 14. In examples where NFC memory 18 stores default configuration parameters 22, computing device 14 can retrieve default configuration parameters 22 via the NFC read operations for display, confirmation, and/or modification by the service engineer or other technician. In examples where NFC memory 18 stores default configuration parameters 22 in the encrypted state (i.e., after encryption using the symmetric key derived from identity information 20), computing device 14 derives the symmetric key using identity information 20 and derivation operations that correspond to (e.g., match) the operations utilized for generating the symmetric key that was used to encrypt default configuration parameters 22. That is, computing device 14 can utilize corresponding operations (e.g., same operations) that were utilized for the generation of the symmetric key and encryption of default configuration parameters 22 to derive, based on identity information 20 (and, in certain examples, a private key), a same (i.e., matching) symmetric key for use in decrypting default configuration parameters 22.

As is further described below, computing device 14 generates, based on identity information 20, further configuration parameters (i.e., configuration parameters not included in default configuration parameters 22) that are utilized by BAS controller 12 for initial configuration and operation. For instance, computing device 14 can generate, based on identity information 20, configuration parameters including, e.g., one or more of a service set identifier (SSID), a password, a Building Automation and Control network (BACnet) Internet Protocol (IP) address, a BACnet Master-Slave Token Passing (MSTP) media access control (MAC) address, a BACnet Attached Resource Computer network (ARCNET) MAC address, and a product type associated with the controller.

Computing device 14 stores, via NFC write operations, the determined configuration parameters in NFC memory 18 as configuration parameters 24. Configuration parameters 24 stored by computing device 14 in NFC memory 18 can include those configuration parameters generated by computing device 14 based on identity information 20 and, in certain examples, default configuration parameters 22 (e.g., as modified and/or confirmed by a service engineer or other technician). In some examples, computing device 14 can store configuration parameters 24 in NFC memory 18 in an encrypted state after encryption using the symmetric key, thereby enhancing security of the communications between computing device 14 and BAS controller 12. In certain examples, computing device 14 can store configuration parameters 24 in combination with one or more data integrity values derived from configuration parameters 24, thereby increasing reliability of the communications.

As described above, the retrieval of identity information 20 and default configuration parameters 22 by computing device 14 from NFC memory 18 via the NFC read operations, as well as the storing of configuration parameters 24 in NFC memory 18 via the NFC write operations, can be performed while BAS controller 12 is in a powered-off state. As such, configuration parameters 24 can, in some examples, be determined and stored within NFC memory 18 while BAS controller 12 is installed at a final destination, but prior to availability (or activation) of electrical power to BAS controller 12.

BAS controller 12, upon transition from the powered-off state to a powered-on state (such as when electrical power is available), retrieves configuration parameters 24 via NFC read operations initiated by a NFC transceiver of BAS controller 12. In examples where configuration parameters 24 are stored in the encrypted state, BAS controller 12 decrypts configuration parameters 24 using the symmetric key that can be stored in memory of BAS controller 12 or derived by BAS controller 12 using identity information 20 (and, in some examples, the private key).

BAS controller 12 configures operational parameters used by BAS controller 12 during operation (e.g., communication parameters, or other operational parameters) according to the retrieved configuration parameters 24. Accordingly, BAS controller 12 can automatically retrieve configuration parameters 24 and perform corresponding configuration operations upon power-up (e.g., initial power-up) of BAS controller 12.

As such, techniques of this disclosure can enable configuration parameters to be securely and reliably generated and stored in NFC memory 18 of NFC tag 16 associated with BAS controller 12. Such configuration parameters can be automatically generated using a software application or other routine executed by computing device 14, thereby increasing efficiency of the service engineers or other technicians to provide configuration parameters for numerous (e.g., tens, hundreds, or even thousands) of BAS controllers. Moreover, the configuration parameters can be generated and stored in NFC memory 18 while BAS controller 12 is in a powered-off state for later retrieval by BAS controller 12 (e.g., after power-up), thereby enabling pre-commissioning activities to be performed prior to availability of electrical system power at the installation location and thereby increasing flexibility of the configuration and commissioning activities.

Figure 2:
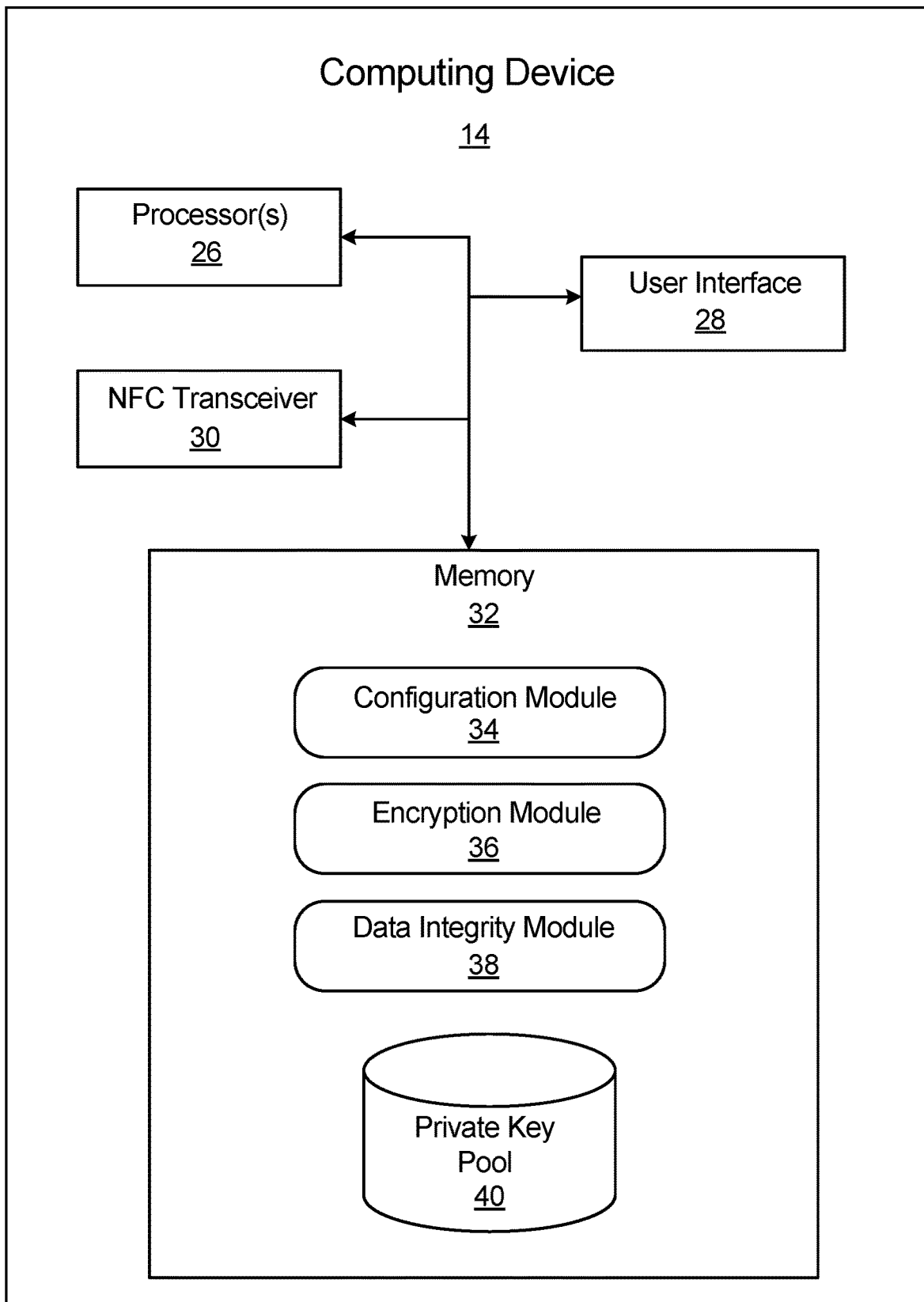
FIG. 2 is a block diagram illustrating further details of the computing device of FIG. 1.

FIG. 2 is a block diagram illustrating further details of computing device 14 of FIG. 1, which can be a laptop computer, a tablet computer, a smartphone, or other mobile computing device capable of communicating via NFC read and write operations with NFC memory 18 of NFC tag 16 associated with BAS controller 12 (FIG. 1). As illustrated in FIG. 2, computing device 14 can include one or more processors 26, user interface 28, NFC transceiver 30, and computer-readable memory 32. Computer-readable memory 32 can store configuration module 34, encryption module 36, data integrity module 38, and private key pool 40.

Processor 26 can be configured to implement functionality and/or process instructions for execution within computing device 14. For instance, processor 26 can be capable of processing instructions stored in computer-readable memory 32, such as computer-readable instructions associated herein with configuration module 34, encryption module 36, and data integrity module 38. Examples of processor 26 can include any one or more of a microprocessor, a digital signal processor (DSP), an application specific integrated circuit (ASIC), a field-programmable gate array (FPGA), or other equivalent discrete or integrated logic circuitry.

Computing device 14 utilizes user interface 28 for receiving input from and outputting information to a user, such as a service engineer or other user. User interface 28 can include physical and/or graphical control elements that enable user input to interact with computing device 14. For instance, user interface 28 can take the form of a graphical user interface (GUI) that presents graphical control elements at, e.g., a display device of user interface 28. In certain examples, computing device 14 can present the GUI at a touch-sensitive and/or presence sensitive display screen to receive user input in the form of gestures, such as touch gestures, scroll gestures, zoom gestures or other gesture input. In certain examples, user interface 28 can include a physical keyboard, a mouse, physical buttons, keys, knobs, or other physical control elements configured to receive user input to interact with computing device 14.

Computing device 14 utilizes NFC transceiver for communicating with one or more remote NFC transceivers and/or NFC tags, such as NFC tag 16 (FIG. 1). As is further described below, computing device 14 can utilize NFC transceiver 30 for retrieving information from and storing information in NFC memory 18 (FIG. 1) via NFC read and write operations.

Computer-readable memory 32 can be configured to store information within computing device 14 during operation. In some examples, computer-readable memory 32 can include non-transitory memory. The term "non-transitory" can indicate that the storage medium is not embodied in a carrier wave or a propagated signal. In certain examples, non-transitory memory can store data that can, over time, change (e.g., in RAM or cache).

In some examples, computer-readable memory 32 can include volatile memory elements that do not maintain stored contents when electrical power to computing device 14 is removed. Examples of volatile memory elements can include random access memories (RAM), dynamic random access memories (DRAM), static random access memories (SRAM), and other forms of volatile memories. In certain examples, computer-readable memory 32 can include non-volatile memory elements configured for long-term storage of information. Examples of such non-volatile memory elements can include, e.g., magnetic hard discs, optical discs, flash memories, or forms of electrically programmable memories (EPROM) or electrically erasable and programmable (EEPROM) memories.

As illustrated in FIG. 2, computer-readable memory 32 can include configuration module 34, encryption module 36, data integrity module 38, and private key pool 40. Configuration module 34, encryption module 36, and data integrity module 38 can take the form of computer-readable instructions that, when executed by processor 26, cause computing device 14 to implement functionality attributed herein to configuration module 34, encryption module 36, and data integrity module 38. Though the example of FIG. 2 is described with respect to separate modules 34, 36, and 38, it should be understood that the techniques described herein with respect to such modules 34, 36, and 38 can be implemented in a single module, two modules, three modules, or more than three modules that distribute functionality attributed herein to modules 34, 36, and 38 among the multiple modules. In general, computer-readable memory 32 can store computer-readable instructions that, when executed by processor 26, cause computing device 14 to operate in accordance with techniques described herein.

In operation, computing device 14 executes configuration module 34, encryption module 36, and data integrity module 38 to retrieve identity information 20 and default configuration parameters 22 from NFC memory 18 of NFC tag 16 associated with BAS controller 12 (FIG. 1), and to generate and store configuration parameters 24 within NFC memory 18, as is further described below. For example, computing device 14 can execute configuration module 34 to cause NFC transceiver 30 to retrieve identity information 20 and default configuration parameters 22 from NFC memory 18 via NFC read operations. Computing device 14 can further execute encryption module 36 to derive a symmetric key using the retrieved identity information 20. In some examples, encryption module 36 can derive the symmetric key using one or more portions of identity information 20 and a private key selected from a set of private keys stored in private key pool 40, as is further described below.

Configuration module 34, executed by computing device 14, can utilize the derived symmetric key to decrypt default configuration parameters 22 for display and/or user modification via user interface 28. Configuration module 34 generates further configuration parameters based on identity information 20, such as one or more of a SSID, password, BACnet IP address, BACnet MSTP MAC address, BACnet ARCNET MAC address, and a product type associated with the BAS controller 12. In some examples, such as when identity information 20 and/or default configuration parameters 22 are associated with a data integrity value, computing device 14 can execute data integrity module 38 to generate a candidate data integrity value based on one or more of identity information 20 and default configuration parameters 22 for use in data integrity checks, as is further described below.

Configuration module 34 utilizes NFC transceiver 30 to store, via NFC write operations, the generated configuration parameters and the confirmed and/or modified default configuration parameters in NFC memory 18 as configuration parameters 24. In some examples, configuration module 34 can store configuration parameters 24 (in combination with one or more derived data integrity values) in NFC memory 18 in an encrypted state after encryption via the derived symmetric key.

Accordingly, computing device 14 can automatically generate configuration parameters for use by BAS controller 12 based on information retrieved from NFC memory 18, thereby increasing efficiency and reducing work-hours required to produce the configuration parameters. Moreover, computing device 14 can generate and store configuration parameters 24 in NFC memory 18 while BAS controller 12 is in a powered-off state, enabling BAS controller 12 to retrieve configuration parameters 24 after transition to a powered-on state and enhancing flexibility in scheduling of configuration and commissioning of BAS controller 12.

Figure 3:
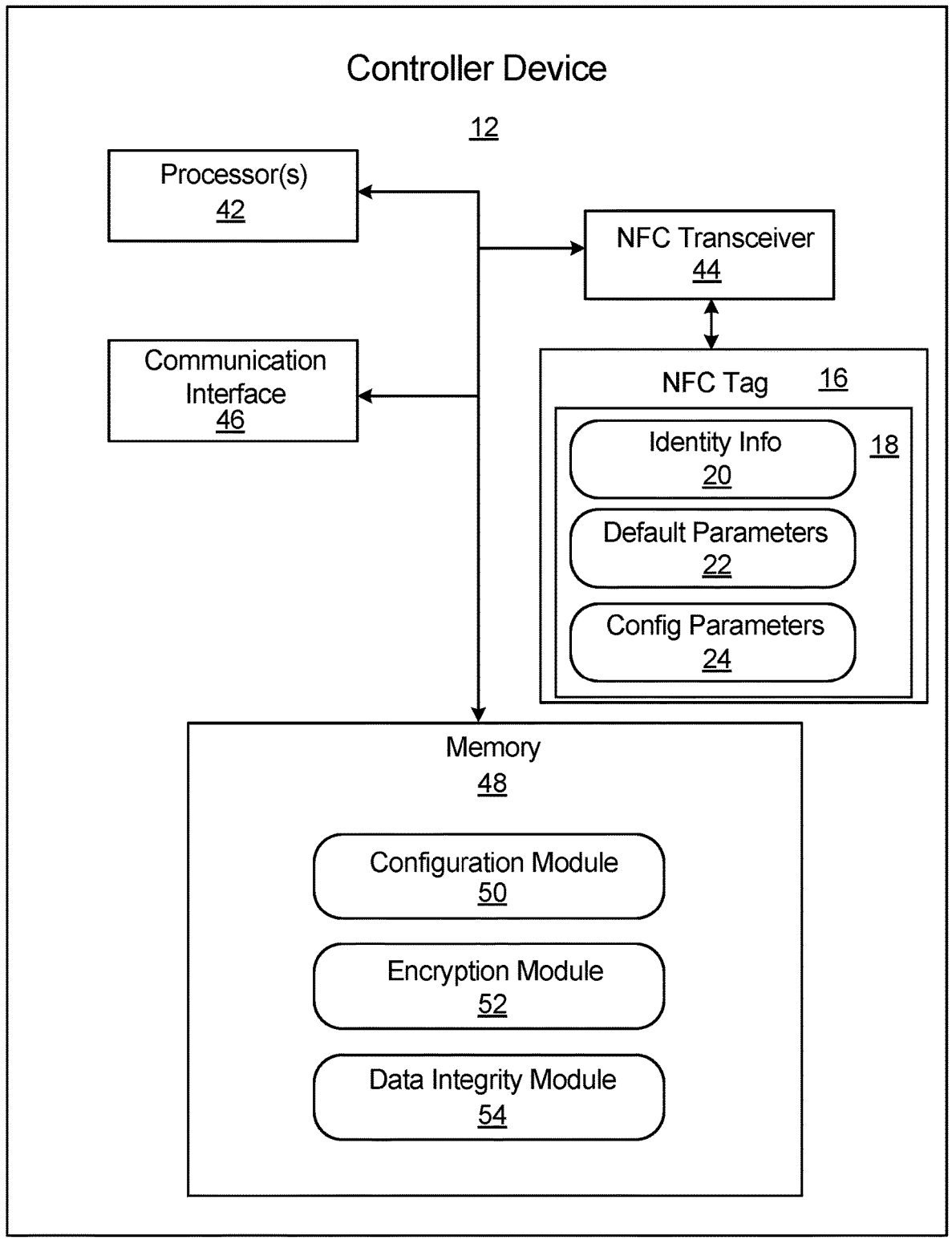
FIG. 3 is a block diagram illustrating further details of the BAS controller of FIG. 1.

FIG. 3 is a block diagram illustrating further details of BAS controller 12 of FIG. 1. As illustrated in FIG. 3, BAS controller 12 includes one or more processors 42, NFC transceiver 44, communication interface 46, and computer-readable memory 48. Computer-readable memory 48, in the example of FIG. 3, includes configuration module 50, encryption module 52, and data integrity module 54.

As further illustrated in FIG. 3, BAS controller 12 can include NFC tag 16 associated therewith. NFC tag 16, as was described above, can be attached (e.g., adhesively or otherwise attached) to BAS controller 12, such as to an interior or exterior of a housing of BAS controller 12. In other examples, NFC tag 16 can be integral with (i.e., formed on a same circuit card with) computer-readable memory 48. NFC tag 16, as illustrated in FIG. 3, includes NFC memory 18 that stores identity information 20, default parameters 22, and configuration parameters 24.

As was similarly described above with respect to processor 26 of computing device 14 (FIG. 2), processor 42 can be configured to implement functionality and/or process instructions for execution within BAS controller 12. Examples of processor 42 can include any one or more of a microprocessor, a digital signal processor (DSP), an application specific integrated circuit (ASIC), a field-programmable gate array (FPGA), or other equivalent discrete or integrated logic circuitry.

BAS controller 12 utilizes NFC transceiver 44 for retrieving configuration parameters 24 from NFC memory 18 via NFC read operations. In some examples, NFC tag 16 and NFC transceiver 44 can be located physically proximate one another within range for wireless NFC communications, such as a range of approximately twenty centimeters (7.87 inches) or less.

Communication interface 46 can include hardware and/or software elements for wired or wireless communications, or both. Controller device 12 utilizes communication interface 46 for wired and/or wireless communications with external devices, such as BAS sub-system components, BAS controllers, or other remote devices. For instance, wireless communications can include, e.g., wireless Ethernet communications, Bluetooth communications, cellular communications such as 3G, 4G, and/or 5G communications, or other wireless communications. Wired communications can include, e.g., wired Ethernet communications, serial bus communications such as RS-232 or RS-485, or other wired communications.

As illustrated in FIG. 3, computer-readable memory 48 includes configuration module 50, encryption module 52, and data integrity module 54. As is further described below, BAS controller 12 executes configuration module 50, encryption module 52, and data integrity module 54 to retrieve configuration parameters 24 and configure operational parameters of BAS controller 12 according to the retrieved parameters 24. For instance, BAS controller 12 can execute configuration module 50 (e.g., in response to a transition from a powered-off state to a powered-on state) to cause NFC transceiver to retrieve configuration parameters 24 from NFC memory 18 via NFC read operations. In examples where configuration parameters 24 are stored in the encrypted state, BAS controller 12 can execute encryption module 52 to decrypt configuration parameters 24 using the symmetric key. The symmetric key can be stored in computer-readable memory 48 or derived by encryption module 52 using identity information 20 (and, in some examples, a private key), as is further described below. In examples where configuration parameters 24 are stored in combination with a data integrity value, BAS controller 12 can execute data integrity module 54 to derive a candidate data integrity value that is compared to the received data integrity value to detect possible corrupted data and to further enhance reliability of the NFC communications.

Accordingly, BAS controller 12 can automatically retrieve configuration parameters 24 and perform corresponding configuration operations upon power-up of BAS controller 12. Such configuration parameters can be generated and stored in NFC memory 18 while BAS controller 12 is in a powered-off state, thereby enabling later retrieval by BAS controller 12 and increasing flexibility of the configuration and commissioning activities.

Figure 4:
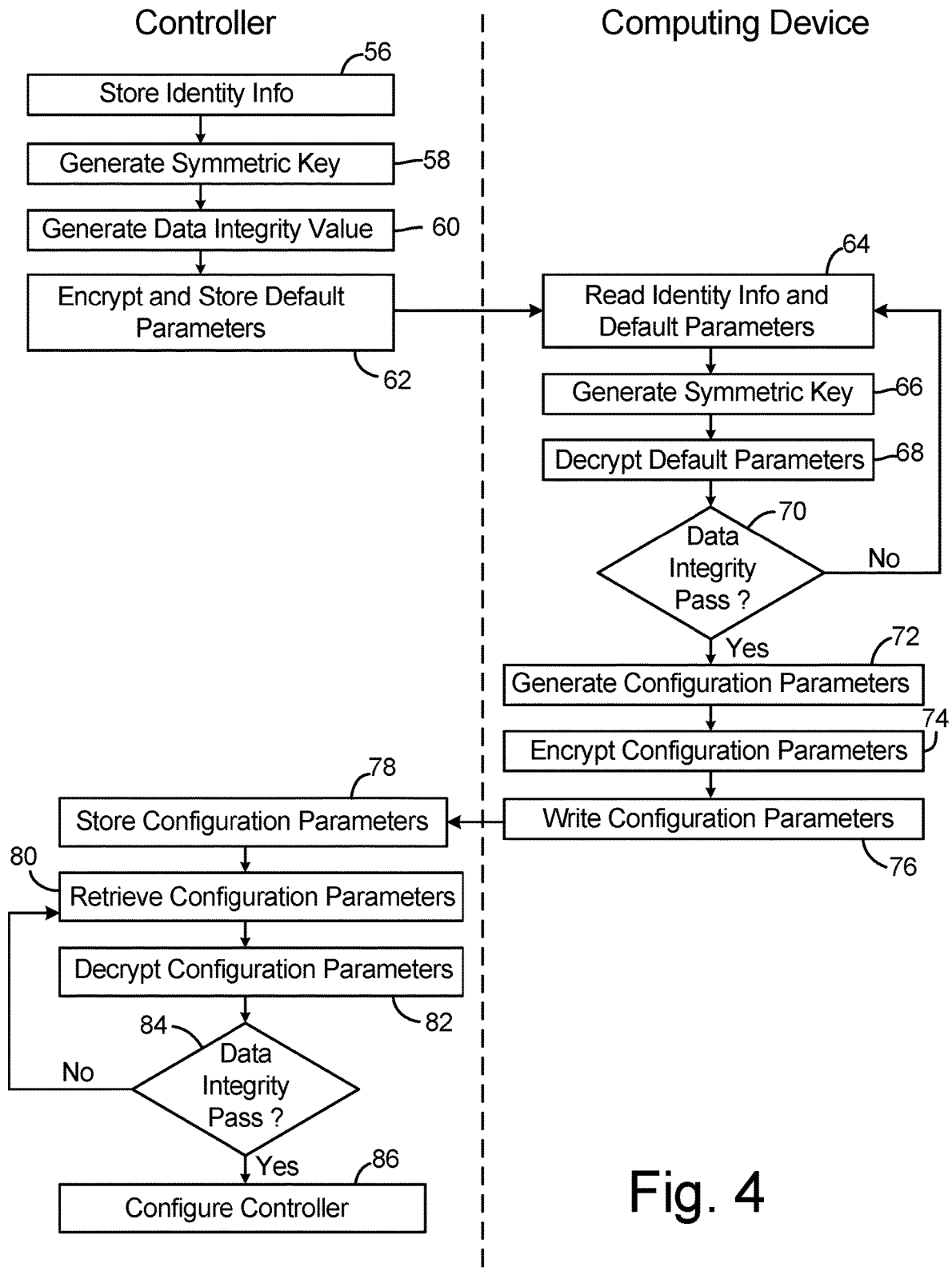
FIG. 4 is a flow diagram illustrating example operations for generating configuration parameters using a NFC tag associated with a BAS controller.

FIG. 4 is a flow diagram illustrating example operations for generating configuration parameters using a NFC tag associated with a BAS controller. For purposes of clarity and ease of discussion, the example operations are described below within the context of system 10 (FIG. 1) including BAS controller 12 (FIGS. 1 and 3) and computing device 14 (FIGS. 1 and 2).

Identity information associated with a controller is stored in memory of a NFC tag associated with the controller (Step 56). For example, identity information 20 associated with BAS controller 12 can be stored in NFC memory 18 of NFC tag 16 associated with BAS controller 12. Identity information 20 can include, e.g., any one or more of a media access control (MAC) address of BAS controller 12, a MAC address of a wireless transceiver of BAS controller 12, a serial number (e.g., a unique serial number) of BAS controller 12, a firmware or other software version number associated with BAS controller 12, or other identity information associated with BAS controller 12. Identity information 20 can be stored in NFC memory 18 by BAS controller 12 (e.g., via NFC transceiver 44) when in a powered-on state, or by a remote computing device, such as a laptop or other NFC programmer in, e.g., a manufacturing or production facility prior to installation (e.g., when BAS controller 12 is in a powered-on state or when BAS controller 12 is in a powered-off state).

A symmetric key is generated using the identity information associated with the controller (Step 58). For example, encryption module 52 of BAS controller 12 (or a remote computing device) can generate the symmetric key as an output of a cryptographic hash function or other obfuscation technique. Examples of such cryptographic has functions can include, e.g., the MD5 message-digest algorithm, the SHA-1 Secure Hash Algorithm, the SHA-256 Secure Hash Algorithm, the SHA-512 Secure Hash Algorithm, the PBKDF2 Password-Based Key Derivation Function 2 algorithm, or other cryptographic algorithm known in the art.

The symmetric key can be derived as an output of the cryptographic hash function with one or more portions of identity information 20 utilized as input. For instance, the symmetric key can be generated as an output of the cryptographic hash function with a combination (e.g., concatenation or other combination) of the serial number and MAC address included in identity information 20 as input. In certain examples, the input to the cryptographic hash function to produce the symmetric key can include a private key, such as a private key stored in computer-readable memory 48 of BAS controller 12. For instance, the input to the cryptographic hash function can be a concatenation or other combination of the serial number, the MAC address, and the private key. The private key, in some examples, can be associated with identity information 20, such as a software (or firmware) version number of software or firmware executed by BAS controller 12, such that the private key can be selected by computing device 14 from a set of private keys having associations with identity information 20, as is further described below.

A data integrity value corresponding to one or more of the identity information and the default configuration parameters is generated (Step 60). For example, data integrity module 54 of BAS controller 12 (or a remote computing device) can generate a data integrity value corresponding to one or more of identity information 20 and default configuration parameters 22. The data integrity value can be generated as an output of a cryptographic hash function or other obfuscation algorithm with identity information 20 and/or default configuration parameters 22 taken as input. The cryptographic has function can be, e.g., the MD5 message-digest algorithm, the SHA-256 Secure Hash Algorithm, the SHA-512 Secure Hash Algorithm, the PBKDF2 Password-Based Key Derivation Function 2 algorithm, or other cryptographic algorithm known in the art.

The data integrity value, in some examples, can be a single data integrity value that corresponds to an entirety of identity information 20 and/or default configuration parameters 22. For instance, the data integrity value can be generated using a combination (e.g., a concatenation) of identity information 20 and/or default configuration parameters 22 as input to generate a single data integrity value. In other examples, separate data integrity values can be generated for each parameter in identity information 20 and/or default configuration parameters. For example, a separate data integrity value can be generated for each of the MAC address of BAS controller 12, the serial number of BAS controller 12, the firmware or other software version number associated with BAS controller 12, or other parameters included in identity information 20. Similarly, a separate data integrity value can be generated, in some examples, for each of the configuration parameters included in default configuration parameters 22. The data integrity value (or values) can be stored in combination with one or more of identity information 20 and default configuration parameters 22, the identity information 20 and/or default configuration parameters 22 constituting a data payload and the data integrity value being stored in combination with the data payload.

The default configuration parameters are encrypted and stored in the memory of the NFC tag associated with the controller (Step 62). For example, default configuration parameters 22, including the associated data integrity value (or values), can be encrypted using the derived symmetric key and stored in NFC memory 18 of NFC tag 16 associated with BAS controller 12. The encryption algorithm utilized for the encryption operations can include, e.g., the Advanced Encryption Standard (AES) encryption algorithm, the Rivest Cipher 4 (RC4) encryption algorithm, the Data Encryption Standard (DES) encryption algorithm, or other encryption algorithm or cryptographic cypher.

The identity information and default configuration parameters stored in the memory of the NFC tag is received by the mobile computing device via NFC read operations (Step 64). For example, a service engineer or other technician can physical place computing device 14 within range of NFC tag 16 of BAS controller 12 to cause computing device 14 to retrieve identity information 20 and default configuration parameters 22 stored in NFC memory 18 via NFC read operations executed by NFC transceiver 30 of computing device 14.

The symmetric key is generated based on the retrieved identity information (Step 66). For example, encryption module 36 of computing device 14 can generate the symmetric key based on identity information 20 using operations that correspond to (e.g., match) those operations utilized for the generation of the symmetric key prior to encryption and storage in NFC memory 18. For instance, encryption module 36 can utilize a same cryptographic hash function as was utilized for generation of the symmetric key (e.g., the MD5 message-digest algorithm, the SHA-1 Secure Hash Algorithm, the SHA-256 Secure Hash Algorithm, the SHA-512 Secure Hash Algorithm, the PBKDF2 Password-Based Key Derivation Function 2 algorithm, or other cryptographic hash algorithm utilized for generation of the symmetric key) with the same combination of identity information 20 taken as input. As an example, in the case that the symmetric key was generated using the SHA-256 Secure Hash Algorithm with a concatenation of the serial number and MAC address stored in identity information 20 taken as input, encryption module 36 can utilize the same concatenation of the serial number and MAC address retrieved from identity information 20 as input to the same cryptographic hash function (i.e., the SHA-256 Secure Hash Algorithm, in this example) to derive the same symmetric key.

In examples where a private key was utilized for generation of the symmetric key (e.g., in combination with identity information 20), encryption module 36 of computing device 14 identifies a corresponding (e.g., matching) private key based on identity information 20 for generation of the symmetric key. For example, private key pool 40 of computing device 14 can store a plurality of private keys, such as tens, hundreds, thousands, or other numbers of private keys, each associated with one or more identity parameters. In one example, private key pool 40 stores a set of private keys, each associated with a software version number. In such an example, encryption module 36 can identify the software version number received in identity information 20, and can select a corresponding private key from private key pool 40. As such, encryption module 36 can generate a matching (e.g., same) symmetric key as was utilized for encryption of default configuration parameters 22.

The received default configuration parameters are decrypted using the derived symmetric key (Step 68). For instance, encryption module 36 of computing device 14 can decrypt default configuration parameters 22 using the derived symmetric key and a corresponding (e.g., matching) encryption algorithm as was used for encryption of default configuration parameters 22, such as the RC4 encryption algorithm, the DES encryption algorithm, or other encryption algorithm. That is, encryption module 36 of computing device 14 can be configured to utilize a same encryption/decryption algorithm as was utilized for encryption of default configuration parameters 22.

A candidate data integrity value is generated based on the received identity information and/or default configuration parameters and compared to the received data integrity value to determine whether the candidate data integrity value matches the received data integrity value (Step 70). For example, data integrity module 38 of computing device 14 can identify the data integrity value (or values) received via the NFC read operations. The data integrity value can be a defined size (e.g., a defined number of bits and/or bytes) and stored (and therefore transmitted) at a defined location within the bit stream of the NFC read operations, such as at a beginning of the bit stream, and end of the bit stream, or other defined location of the bit stream of the NFC read operations. Data integrity module 38 of computing device 14 can generate a candidate data integrity value using a corresponding (e.g., same) cryptographic hash function as was utilized to generate the data integrity value, such as the MD5 message-digest algorithm, the SHA-256 Secure Hash Algorithm, the SHA-512 Secure Hash Algorithm, the PBKDF2 Password-Based Key Derivation Function 2 algorithm, or other cryptographic algorithm. Data integrity module 38 compares the candidate data integrity value to the received data integrity value to determine whether the candidate data integrity value matches the received data integrity value (e.g., passes a data integrity check).

In examples where the data integrity value does not match the received data integrity value ("NO" branch of Step 70), computing device 14 can perform additional NFC read operations to retrieve identity information 20 and default configuration parameters 22 (Step 64). For instance, data integrity module 38, in response to determining that the candidate data integrity value does not match the received data integrity value, can output a notification or other alert (e.g., via user interface 28) to notify the user of computing device 14 that the NFC read operations were unsuccessful and suggesting that the user place computing device 14 within range for additional (i.e., substitute) NFC read operations.

In examples where the data integrity value matches the received data integrity value ("YES" branch of Step 70), computing device 14 generates further configuration parameters based on identity information 20 (Step 72). For example, configuration module 34 can generate one or more configuration parameters that are derived from identity information 20, as is further described below. The derived configuration parameters can include, e.g., one or more of a SSID, a password, a BACnet IP address, a BACnet MSTP MAC address, a BACnet ARCNET MAC address, and a product type associated with the controller.

In some examples, computing device 14 can present default configuration parameters 22 received via the NFC read operations for display, confirmation, and/or user modification via user interface 28. As such, the generated configuration parameters can additionally include one or more of the confirmed and/or modified default configuration parameters 22.

In certain examples, such as the example of FIG. 4, generation of the configuration parameters can include the generation of a data integrity value corresponding to the one or more generated configuration parameters. For instance, as was similarly described above, data integrity module 38 can generate a data integrity value (or values) corresponding to one or more of the generated configuration parameters and the confirmed and/or modified default configuration parameters 22.

The configuration parameters are encrypted using the symmetric key (Step 74). For example, encryption module 36 can encrypt the configuration parameters, including the data integrity value (or values), using the symmetric key, such as via the RC4 encryption algorithm, the DES encryption algorithm, or other encryption algorithm.

The encrypted configuration parameters are transmitted via NFC write operations (Step 76) and stored in NFC memory of the NFC tag associated with the controller (Step 78). For instance, configuration module 34 of computing device 14 can cause NFC transceiver 30 to store configuration parameters 24 in NFC memory 18 of NFC tag 16 via NFC write operations.

The configuration parameters are retrieved by the controller from the NFC memory of the NFC tag (Step 80). For example, BAS controller 12 can retrieve, via NFC read operations using NFC transceiver 44, configuration parameters 24 stored in NFC memory 18.

The retrieved configuration parameters are decrypted by the controller (Step 82). For instance, encryption module 52 of BAS controller 12 can decrypt the retrieved configuration parameters 24 using the symmetric key and the corresponding (e.g., same) encryption algorithm that was used by computing device 14 to encrypt configuration parameters 24. BAS controller 12, in some examples, stores the symmetric key in computer-readable memory 48 for retrieval and decryption operations. In other examples, BAS controller 12 derives the symmetric key based on identity information 20 (e.g., stored in computer-readable memory 48 or retrieved from NFC memory 18).

A candidate data integrity value is generated based on the retrieved configuration parameters and compared to the received data integrity value to determine whether the candidate data integrity value matches the received data integrity value (Step 84). For example, data integrity module 54 of BAS controller 12 can identify the data integrity value (or values) received via the NFC read operations. Data integrity module 54 generates the candidate data integrity value using a corresponding (e.g., same) cryptographic hash function as was utilized to generate the data integrity value, and compares the candidate data integrity value to the received data integrity value to determine whether the candidate data integrity value matches the received data integrity value (e.g., passes a data integrity check).

In response to determining that the candidate data integrity value does not match the received data integrity value ("NO" branch of Step 84), BAS controller 12 retrieves configuration parameters 24 in substitute NFC read operations (Step 80). In response to determining that the candidate data integrity value matches the received data integrity value ("YES" branch of Step 84), BAS controller 12 performs configuration operations to configure operational parameters of BAS controller 12 according to the received configuration parameters (Step 86).

Accordingly, configuration parameters for BAS controller 12 are generated by mobile computing device 14 and stored in NFC memory 18 of NFC tag 16 associated with BAS controller 12 for later retrieval and configuration operations performed by BAS controller 12. Security of the NFC communications is enhanced via encryption operations. Reliability of the communications is enhanced through the use of data integrity values associated with the parameters. The configuration parameters can be generated and stored in NFC memory 18 while BAS controller 12 is in a powered-off state, thereby increasing flexibility of scheduling for configuration and commissioning operations. Moreover, the automatic generation of various configuration parameters by computing device 14 using the stored identity information increases the efficiency by which such parameters are generated, thereby decreasing the total time required and the associated cost for commissioning operations.

FIGS. 5-8 are flow diagrams illustrating example operations for generating configuration parameters based on identity information associated with a controller. Accordingly, FIGS. 5-8 illustrate further details of the example operations of Step 72 of FIG. 4. For purposes of clarity and ease of discussion, the example operations of FIGS. 5-8 are described below in the context of system 10 (FIG. 1) including BAS controller 12 (FIGS. 1 and 3) and computing device 14 (FIGS. 1 and 2).

Figure 5:
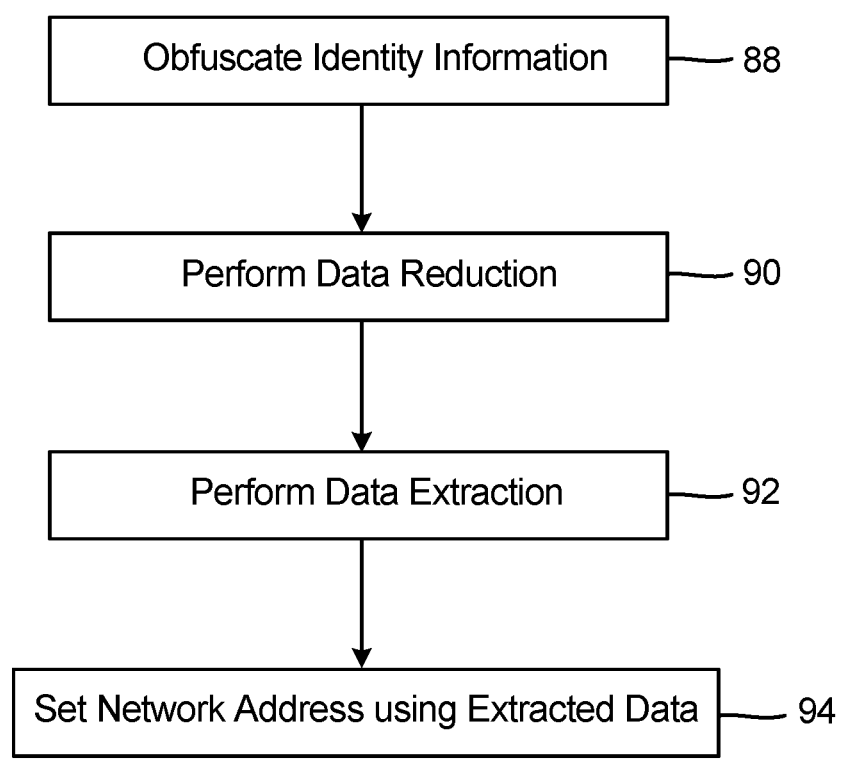
FIG. 5 is a flow diagram illustrating example operations for generating a network address configuration parameter for a BAS controller.

FIG. 5 is a flow diagram illustrating example operations for generating a network address configuration parameter. The network address can be, e.g., one or more of a MAC address and an IP address. Example MAC addresses can include, for example, a BACnet MSTP MAC address or a BACnet ARCNET MAC address. The IP address can be, e.g., a BACnet IP address.

As illustrated in FIG. 1, identity information associated with the controller device is obfuscated (Step 88). For instance, configuration module 34 of computing device 14 can obfuscate one or more portions of identity information 20 to produce obfuscated identity information. Obfuscation techniques can include, e.g., a cryptographic hash function or other obfuscation technique, and can help to ensure that the generated network address configuration parameter is unique to the particular controller device (e.g., unique to BAS controller 12).

As an example, configuration module 34 can perform obfuscation techniques according to the SHA-256 Secure Hash Algorithm on a concatenation of serial number identity information (e.g., a serial number of "HRA0000000740") and MAC address identity information (e.g., a MAC address of "00:E0:C9:00:00:01") retrieved from identity information 20 to produce a unique 256-bit number. In such an example, the output of the SHA-256 Secure Hash Algorithm on the concatenated serial number and MAC address results in the 256-bit number "0x31fdcc108551-bc2f21c5c723559101c6f8602b18a68d1469724c296f0a9-d4c39."

Data reduction is performed on the obfuscated identity information (Step 90). For instance, configuration module 34 can reduce the size of the obfuscated identity information, such as by performing a 32-bit cyclic redundancy check (CRC32) operation or a Fowler-Noll-Vo 1a (FNV-1a) hash operation on the obfuscated identity information to reduce the size of the obfuscated identity information from 256 bits to 32 bits. As an example, the output of CRC32 operations on the obfuscated identity information number having the value "0x31fdcc108551bc2f21c5c72355-9101c6f8602b18a68d1469724c296f0a9d4c39" results in the 32-bit number "0xaaea8942."

Data extraction is performed on the reduced obfuscated identity information (Step 92). For instance, configuration module 34 can extract one or more portions of the reduced obfuscated identity information to derive the MAC address and/or IP address configuration parameter information. As an example, configuration module 34 can perform a bitwise AND of the reduced obfuscated identity information with a value of 0x7F to produce a number having a value between 0 and 127 for use as a BACnet MSTP MAC address. In the example of FIG. 5, configuration module 34 can perform a bitwise AND of the reduced obfuscated identity information having the value "0xaaea8942" to derive BACnet MSTP MAC address information as the number "66". Configuration module 34 can perform a modulus operation of the reduced obfuscated identity information with the number 253 and can add a value of one to the resulting number to derive ARCNET MAC address information as a number having a value between 1 and 254. For instance, configuration module 34 can perform the modulus operation on the reduced obfuscated identity information having the value "0xaaea8942" and can add a value of one to the resultant to derive ARCNET MAC address information as a number having a value of 90.

Configuration module 34 can perform a modulus operation of the reduced obfuscated identity information with the value 253 and can add a value of one to the resulting number to derive a value for a last octet of BACnet IP address information. For instance, in an example where configuration module 34 performs data reduction operations on the obfuscated identity information by performing a FNV-1a hash algorithm on the obfuscated identity information to produce the 32-bit number having a value of "0x937dd764," configuration module 34 can perform a modulus operation on the value of "0x937dd764" with the number 253 and can add a value of 1 to produce a value of a last octet of BACnet IP address information as a number having a value of 21.

The network address configuration parameter (or parameters) are determined using the extracted data (Step 94). For example, configuration module 34 can set the BACnet MSTP MAC address configuration parameter as the value derived from the obfuscation, data reduction, and data extraction operations (e.g., the numeric value 66 in the example of FIG. 5). Similarly, configuration module 34 can set the BACnet ARCNET MAC address and/or the BACnet IP address as the value derived from the obfuscation, data reduction, and data extraction operations, such as the BACnet ARCNET MAC address as the value of 90 and/or the BACnet IP address last octet value of 21, as in the example of FIG. 5.

Accordingly, computing device 14 can derive network address information based on identity information 20 stored in NFC memory 18 of NFC tag 16 associated with BAS controller 12. Computing device 14 can, in some examples, present the derived network address information for display at user interface 28 of computing device 14 for confirmation and/or modification. As such, computing device 14 can automatically generate network address information to increase efficiency of configuration and commissioning operations by the service engineer or other technician.

Figure 6:
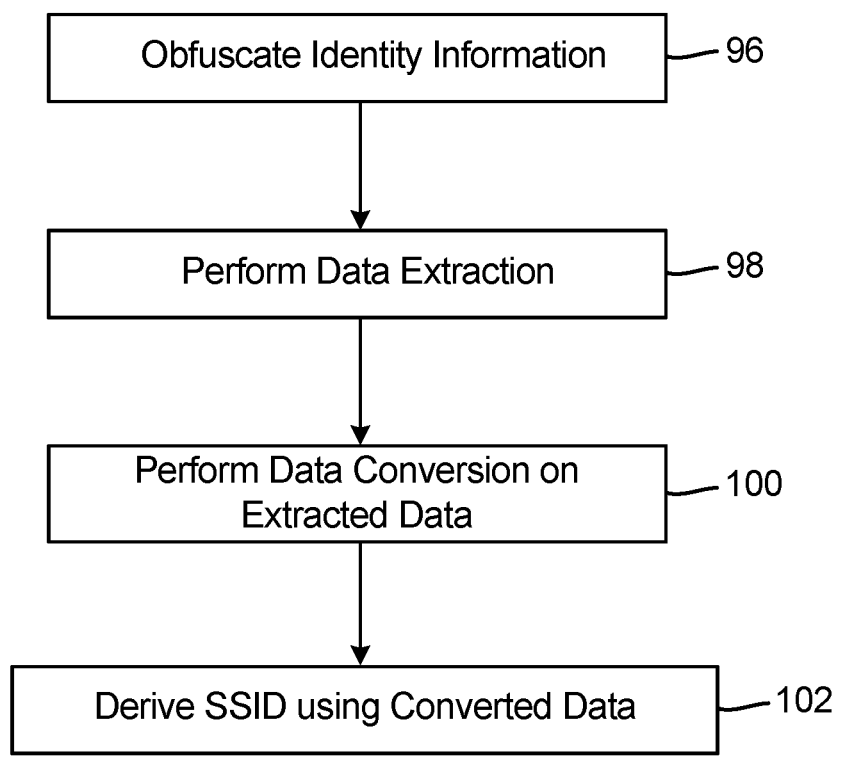
FIG. 6 is a flow diagram illustrating example operations for generating a service set identifier (SSID) configuration parameter for a BAS controller.

FIG. 6 is a flow diagram illustrating example operations for generating a SSID configuration parameter. As illustrated in FIG. 6, identity information associated with the controller device is obfuscated (Step 96). For instance, configuration module 34 of computing device 14 can obfuscate one or more portions of identity information 20 to produce obfuscated identity information. Obfuscation techniques can include, e.g., a cryptographic hash function or other techniques.

As an example, configuration module 34 can perform obfuscation techniques according to the SHA-1 Secure Hash Algorithm on a concatenation of serial number identity information (e.g., a serial number of "HRA0000000740") and MAC address identity information (e.g., a MAC address of "00:E0:C9:00:00:01") retrieved from identity information 20 to produce a unique 128-bit number. In such an example, the output of the SHA-1 Secure Hash Algorithm on the concatenated serial number and MAC address results in the 128-bit number "0x86bb62bd58785214dc2988616a0e66dd9c7155b."

Data extraction is performed on the obfuscated identity information (Step 98). For example, configuration module 34 can extract one or more portions of the obfuscated identity information for use in generating the SSID configuration parameter. For instance, configuration module 34 can extract a most significant two bytes of from the obfuscated identity information, a least significant two bytes, or other sizes of data (e.g., more or less than two bytes of data) from any defined location of the obfuscated identity information. In the example of FIG. 6, configuration module 34 extracts a most significant two bytes from the obfuscated identity information having the value "0x86bb62bd58785214dc2988616a0e66dd9c7155b" to produce extracted data having the value "0x86bb."

Data conversion is performed on the extracted data (Step 100). For instance, configuration module 34 can convert the extracted data (e.g., in hexadecimal form) to decimal form, textual character form, or other converted form. In the example of FIG. 6, configuration module 34 converts the extracted data having the hexadecimal value "0x86bb" to decimal form to produce converted data having the numerical value 34491.

The SSID is derived using the converted data (Step 102). For example, configuration module 34 can derive the SSID by appending the converted data to the serial number identity information to produce the SSID having the value "HRA0000000740_34491." In other examples, configuration module 34 can derive the SSID as any combination of the converted data with any of identity information 20. Configuration module 34 can determine the SSID configuration parameter as the derived SSID information. Accordingly, computing device 14 can automatically derive an SSID configuration parameter based on identity information 20 stored in NFC memory 18 of NFC tag 16, thereby increasing efficiency of configuration and commissioning operations associated with BAS controller 12.

Figure 7:
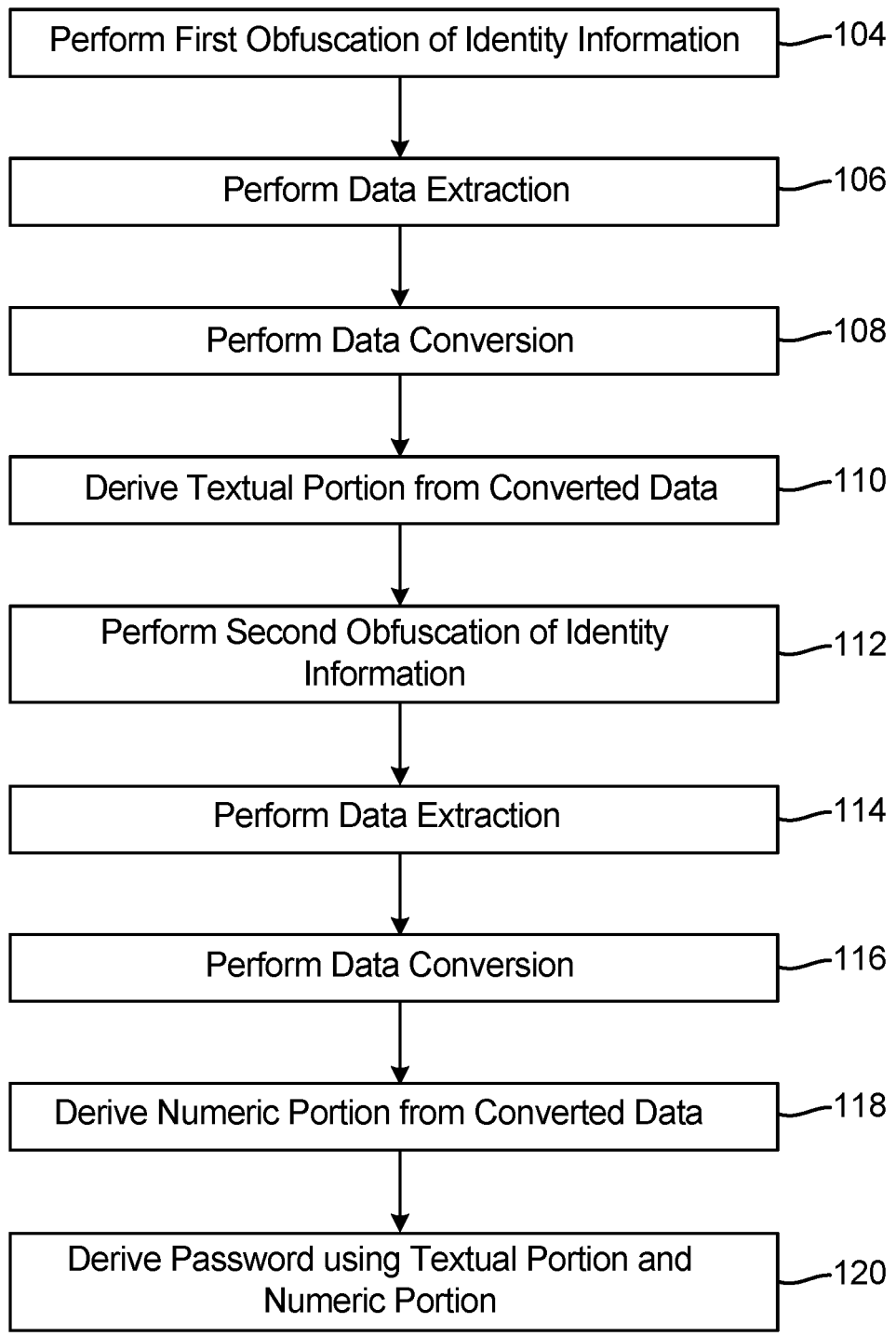
FIG. 7 is a flow diagram illustrating example operations for generating a password configuration parameter for a BAS controller.

FIG. 7 is a flow diagram illustrating example operations for generating a password configuration parameter. As illustrated in FIG. 7, first obfuscation operations are performed on identity information associated with the controller device (Step 104). For example, configuration module 34 of computing device 14 can obfuscate one or more portions of identity information 20 associated with BAS controller 12 to produce obfuscated identity information. Obfuscation techniques can include, e.g., a cryptographic hash function or other obfuscation techniques. As an example, configuration module 34 can derive first obfuscated identity information by performing obfuscation operations according to the SHA-256 Secure Hash Algorithm on a concatenation of serial number information (e.g., the serial number "HRA0000000740") and MAC address identity information (e.g., the MAC address "00:E0:C9:00:00:01") to derive the 256-bit number having the value "0x31fdcc108551bc2f21c5c723559101c6f8602b18a68-d1469724c296f0a9d4c39."

Data extraction is performed on the obfuscated identity information (Step 106). For instance, configuration module 34 can extract one or more portions of the obfuscated identity information for use in generating the password configuration parameter. In the example of FIG. 7, configuration module 34 extracts the most significant byte, the middle two bytes (e.g., the sixteenth and seventeenth bytes), and the least significant byte, though other numbers of bytes and different portions of the obfuscated identity information can be extracted in other examples. Configuration module 34 arranges the extracted bytes to produce extracted information, such as by arranging the extracted bytes in the following order: <most significant byte>; <middle two bytes>; <least significant byte>, though other orders and combinations of the extracted information are possible. In the example of FIG. 7, configuration module 34 arranges the extracted bytes to produce the extracted information having the numerical value "0x31c6f839."

Data conversion operations are performed on the extracted data (Step 108). For instance, configuration module 34 can convert the extracted data using base64 to produce printable content "MzFjNmY4Mzk." In other examples, configuration module 34 can perform different data conversion operations, such as by converting the extracted data to decimal form, textual character form, or other data conversions.

A textual portion of the password configuration parameter is determined from the converted extracted data (Step 110). For example, configuration module 34 can determine a textual portion of the password configuration parameter as the converted, printable content "MzFjNmY4Mzk."

Second obfuscation operations are performed on the identity information associated with the controller device (Step 112). For example, configuration module 34 can perform obfuscation operations, such as CRC32 operations or other obfuscation operations, on the one or more portions of identity information 20, such as the concatenation of the serial number and the MAC address. In the example of FIG. 7, configuration module 34 performs CRC32 operations on the concatenation of the serial number "HRA0000000740" and the MAC address identity information "00:E0:C9:00:00:01" to derive the 32-bit number having the value "0x57735d3c."

Data extraction operations are performed on the second obfuscated identity information (Step 114). For instance, configuration module 34 can extract one or more portions of the second obfuscated identity information to produce second extracted data. In the example of FIG. 7, configuration module 34 performs data extraction operations on the second obfuscated identity information having the value "0x57735d3c" by extracting the least significant two bytes to produce the second extracted data having the value "0x5d3c," though other data extraction operations are possible.

Data conversion operations are performed on the second extracted data (Step 116). For example, configuration module 34 can perform data conversion operations on the second extracted data by converting the second extracted data to decimal form, though in other examples, the data conversion operations can include a conversion to textual form or other representational form. In the example of FIG. 7, configuration module 34 performs the data conversion operations on the second extracted data having the value "0x5d3c" by converting the second extracted data to decimal form to produce second converted data having the value "23868."

A numeric portion of the password configuration parameter is determined using the second converted data (Step 118). For instance, configuration module 34 can determine the numeric portion of the password configuration parameter as the second converted data. In the example of FIG. 7, configuration module 34 determines the numeric portion of the password configuration parameter as the second converted data having the value "23868."

A password configuration parameter is derived using the determined textual portion and the determined numeric portion (Step 120). For example, configuration module 34 can derive the password configuration parameter as the concatenation or other combination of the textual portion and the numeric portion. In the example of FIG. 7, configuration module 34 determines the password configuration parameter by appending the determined numeric portion to the determined textual portion to produce the password configuration parameter having the value "MzFjNmY4Mzk23868."

Accordingly, computing device 14 can derive a password configuration parameter based on identity information 20 stored in NFC memory 18 of NFC tag 16. As such, computing device 14, implementing techniques of this disclosure, can automatically derive a password configuration parameter based on the stored identity information, thereby increasing efficiency of configuration and commissioning operations associated with BAS controller 12.

Figure 8:
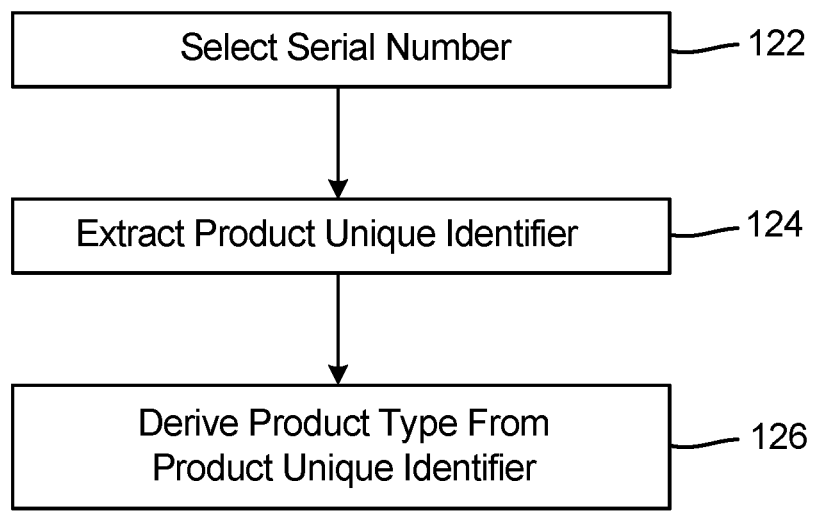
FIG. 8 is a flow diagram illustrating example operations for generating a product type configuration parameter for a BAS controller.

FIG. 8 is a flow diagram illustrating example operations for generating a product type configuration parameter. As illustrated in FIG. 8, serial number information associated with the controller device is selected from the stored identity information (Step 122). For example, configuration module 34 can select the serial number information stored in identity information 20 of NFC memory 18 of NFC tag 16. In the example of FIG. 8, configuration module 34 selects serial number information having the value "RT268002RP" from identity information 20.

A unique product type identifier is extracted from the selected serial number information (Step 124). For example, serial number information stored at identity information 20 can be stored in a format that includes product type information that is unique to the type of product (e.g., controller device). In the example of FIG. 8, configuration module 34 extracts the first combination of letters and the first combination of numbers as the product type information to produce product type information having the value "RT268002."

The product type configuration parameter is derived from the extracted unique product type information (Step 126). For instance, the product type configuration parameter can be derived as the first combination of letters concatenated with a letter "X" to represent an arbitrary serial number corresponding to the product type. In the example of FIG. 8, configuration module 34 derives the product type configuration parameter as having the value "RTX," corresponding to the initial combination of letters "RT" and the concatenation with the letter "X." Computing device 14, implementing techniques of this disclosure, can therefore automatically generate a product type configuration parameter, thereby increasing efficiency of the configuration and commissioning operations.

As such, techniques of this disclosure can enable configuration parameters to be securely and reliably generated and stored in NFC memory of a NFC tag associated with a BAS controller. Such configuration parameters can be automatically generated using a software application or other routine executed by a mobile computing device, thereby increasing efficiency of the service engineers or other technicians to provide configuration parameters for numerous (e.g., tens, hundreds, or even thousands) of BAS controllers. Moreover, the configuration parameters can be generated and stored in the NFC memory while the BAS controller is in a powered-off state for later retrieval by the BAS controller 12 (e.g., after power-up), thereby enabling pre-commissioning activities prior to availability of electrical system power at the installation location and increasing flexibility of the configuration and commissioning activities. The techniques described herein can therefore decrease the total number of work-hours required for the configuration and commissioning of BAS controllers while also increasing the flexibility of timing for the configuration and commissioning operations.

Discussion of Possible Embodiments

The following are non-exclusive descriptions of possible embodiments of the present invention.

A method for generating configuration parameters for a controller comprises receiving, by a mobile computing device, identity information associated with the controller via Near Field Communication (NFC) read operations from memory of a NFC tag associated with the controller. The method further comprises generating, by the mobile computing device, one or more configuration parameters for the controller based on the received identity information associated with the controller, and storing, by the mobile computing device via NFC write operations, the configuration parameters in the memory of the NFC tag for later retrieval and configuration operations by the controller.

The method of the preceding paragraph can optionally include, additionally and/or alternatively, any one or more of the following features, configurations, operations, and/or additional components:

The method can further include receiving, by the mobile computing device via the NFC read operations, one or more default configuration parameters of the controller stored in the memory of the NFC tag associated with the controller.

The one or more default configuration parameters of the controller can be stored in the memory of the NFC tag in an encrypted state after encryption via a symmetric key.

The method can further include deriving, by the mobile computing device, the symmetric key using the received identity information associated with the controller.

The method can further include decrypting the one or more default configuration parameters from the encrypted state using the derived symmetric key.

Deriving the symmetric key using the received identity information associated with the controller can include deriving the symmetric key using the received identity information associated with the controller and a private key stored in memory of the mobile computing device.

The method can further include selecting the private key from a set of private keys stored in the memory of the mobile computing device using the received identity information associated with the controller.

The method can further include encrypting, by the mobile computing device, the configuration parameters using the derived symmetric key to produce encrypted configuration parameters.

Storing, by the mobile computing device via the NFC write operations, the configuration parameters in the memory of the NFC tag can include storing the encrypted configuration parameters in the memory of the NFC tag for later retrieval and configuration operations by the controller.

The one or more default configuration parameters of the controller can be stored in the memory of the NFC tag as a data payload including the default configuration parameters and a data integrity value generated as an output of a cryptographic hash function performed on the data payload.

Receiving the one or more default parameters of the controller via the NFC read operations can include receiving the data payload including the default configuration parameters and the data integrity value.

The method can further include performing, by the mobile computing device, the cryptographic hash function on the received data payload to derive a candidate data integrity value, comparing the candidate data integrity value and the received data integrity value, utilizing the received data payload as the default configuration parameters in response to determining that the candidate data integrity value matches the received data integrity value, and rejecting the received data payload in response to determining that the candidate data integrity value does not match the received data integrity value.

Generating the one or more configuration parameters for the controller based on the received identity information associated with the controller can include obfuscating the received identity information associated with the controller to produce obfuscated identity information associated with the controller, and generating the one or more configuration parameters for the controller using the obfuscated identity information associated with the controller.

The received identity information associated with the controller can include a serial number associated with the controller.

The received identity information associated with the controller can include a media access control (MAC) address associated with the controller.

The received identity information associated with the controller can include a firmware version identifier associated with firmware of the controller.

Generating the one or more configuration parameters for the controller based on the received identity information associated with the controller can include generating the one or more configuration parameters to include a Service Set Identifier (SSID).

Generating the one or more configuration parameters for the controller based on the received identity information associated with the controller can include generating the one or more configuration parameters to include a password.

Generating the one or more configuration parameters for the controller based on the received identity information associated with the controller can include generating the one or more configuration parameters to include a Building Automation and Control network (BACnet) Internet Protocol (IP) address.

Generating the one or more configuration parameters for the controller based on the received identity information associated with the controller can include generating the one or more configuration parameters to include a BACnet Master-Slave Token Passing (MSTP) media access control (MAC) address.

Generating the one or more configuration parameters for the controller based on the received identity information associated with the controller can include generating the one or more configuration parameters to include a BACnet Attached Resource Computer network (ARCNET) MAC address.

Generating the one or more configuration parameters for the controller based on the received identity information associated with the controller can include generating the one or more configuration parameters to include a product type associated with the controller.

Receiving the identity information associated with the controller via the NFC read operations from the memory of the NFC tag associated with the controller, generating the one or more configuration parameters for the controller, and storing the configuration parameters in the memory of the NFC tag via the NFC write operations can be performed while the controller is in a powered-off state.

The NFC read operations can include first NFC read operations. The method can further include transitioning the controller from the powered-off state to a powered-on state, retrieving, by the controller via second NFC read operations, the configuration parameters stored by the mobile computing device via the NFC write operations, and configuring the controller according to the retrieved configuration parameters.

A controller includes one or more processors, computer-readable memory, a Near Field Communication (NFC) transceiver, and a NFC tag. The NFC tag includes NFC memory that stores identity information corresponding to the controller. The computer-readable memory of the controller is encoded with instructions that, when executed by the one or more processors, cause the controller to retrieve, via the NFC transceiver, configuration parameters stored in the NFC memory, and configure the controller using the retrieved configuration parameters.

The controller of the preceding paragraph can optionally include, additionally and/or alternatively, any one or more of the following features, configurations, operations, and/or additional components:

The NFC memory can further store one or more default configuration parameters of the controller.

The configuration parameters stored in the NFC memory can be stored in the NFC memory in an encrypted state after encryption via a symmetric key.

The computer-readable memory of the controller can be further encoded with instructions that, when executed by the one or more processors, cause the controller to decrypt the configuration parameters stored in the NFC memory using the symmetric key.

The computer-readable memory of the controller can be further encoded with instructions that, when executed by the one or more processors, cause the controller to derive the symmetric key using the identity information corresponding to the controller.

A method of configuring a controller includes storing, in memory of a NFC tag associated with the controller, identity information corresponding to the controller. The method further includes retrieving, by the controller after transition of the controller from a powered-off state to a powered-on state, encrypted configuration parameters stored in the memory of the NFC tag, and generating, by the controller, a symmetric key based on the identity information corresponding to the controller. The method further includes decrypting, by the controller using the symmetric key, the encrypted configuration parameters retrieved from the memory of the NFC tag to produce decrypted configuration parameters, and configuring the controller according to the decrypted configuration parameters The method of the preceding paragraph can optionally include, additionally and/or alternatively, any one or more of the following features, configurations, operations, and/or additional components:

Storing the identity information corresponding to the controller in the memory of the NFC tag associated with the controller can include storing the identity information corresponding to the controller in the memory of the NFC tag while the controller is in a powered-off state.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for generating configuration parameters for a controller, the method comprising:
   receiving, by a mobile computing device, identity information associated with the controller via Near Field Communication (NFC) read operations from memory of a NFC tag associated with the controller;
   generating, by the mobile computing device, one or more configuration parameters for the controller based on the received identity information associated with the controller;
   storing, by the mobile computing device via NFC write operations, the configuration parameters in the memory of the NFC tag for later retrieval and configuration operations by the controller;
   wherein the steps of receiving the identity information associated with the controller via the NFC read operations from the memory of the NFC tag associated with the controller, generating the one or more configuration parameters for the controller, and storing the configuration parameters in the memory of the NFC tag via the NFC write operations are performed while the controller is in a powered-off state; and
   wherein the NFC read operations comprise first NFC read operations and the method further comprises:
      transitioning the controller from the powered-off state to a powered-on state;
      automatically retrieving, by the controller via second NFC read operations, the configuration parameters stored by the mobile computing device via the NFC write operations; and
      automatically configuring the controller according to the retrieved configuration parameters.

2. The method of claim 1, further comprising:
receiving, by the mobile computing device via the NFC read operations, one or more default configuration parameters of the controller stored in the memory of the NFC tag associated with the controller.

3. The method of claim 2,
wherein the one or more default configuration parameters of the controller are stored in the memory of the NFC tag in an encrypted state after encryption via a symmetric key.

4. The method of claim 3, further comprising:
deriving, by the mobile computing device, the symmetric key using the received identity information associated with the controller; and
decrypting the one or more default configuration parameters from the encrypted state using the derived symmetric key.

5. The method of claim 4,
wherein deriving the symmetric key using the received identity information associated with the controller comprises deriving the symmetric key using the received identity information associated with the controller and a private key stored in memory of the mobile computing device.

6. The method of claim 5, further comprising:
selecting the private key from a set of private keys stored in the memory of the mobile computing device using the received identity information associated with the controller.

7. The method of claim 4, further comprising:
encrypting, by the mobile computing device, the configuration parameters using the derived symmetric key to produce encrypted configuration parameters;
wherein storing, by the mobile computing device via the NFC write operations, the configuration parameters in the memory of the NFC tag comprises storing the encrypted configuration parameters in the memory of the NFC tag for later retrieval and configuration operations by the controller.

8. The method of claim 2,
wherein the one or more default configuration parameters of the controller are stored in the memory of the NFC tag as a data payload including the default configuration parameters and a data integrity value generated as an output of a cryptographic hash function performed on the data payload;

wherein receiving the one or more default parameters of the controller via the NFC read operations comprises receiving the data payload including the default configuration parameters and the data integrity value; and wherein the method further comprises:
performing, by the mobile computing device, the cryptographic hash function on the received data payload to derive a candidate data integrity value;
comparing the candidate data integrity value and the received data integrity value;
utilizing the received data payload as the default configuration parameters in response to determining that the candidate data integrity value matches the received data integrity value; and
rejecting the received data payload in response to determining that the candidate data integrity value does not match the received data integrity value.

9. The method of claim 1,
wherein generating the one or more configuration parameters for the controller based on the received identity information associated with the controller comprises:
obfuscating the received identity information associated with the controller to produce obfuscated identity information associated with the controller; and
generating the one or more configuration parameters for the controller using the obfuscated identity information associated with the controller.

10. The method of claim 1,
wherein the received identity information associated with the controller comprises at least one of a serial number associated with the controller, a media access control (MAC) address associated with the controller, and a firmware version identifier associated with firmware of the controller.

11. The method of claim 1,
wherein generating the one or more configuration parameters for the controller based on the received identity information associated with the controller comprises generating the one or more configuration parameters to include at least one of a Service Set Identifier (SSID), a password, a Building Automation and Control network (BACnet) Internet Protocol (IP) address, a BACnet Master-Slave Token Passing (MSTP) media access control (MAC) address, a BACnet Attached Resource Computer network (ARCNET) MAC address, and a product type associated with the controller.

12. A controller, comprising:
one or more processors;
computer-readable memory;
a Near Field Communication (NFC) transceiver; and
a NFC tag including NFC memory configured to transmit, to a mobile device via NFC write operations, identity information associated with the controller and to receive, from the mobile device, and store configuration parameters corresponding to the controller when the controller is in a powered-off state;

wherein the computer-readable memory of the controller is encoded with instructions that, when executed by the one or more processors when the controller transitions to a powered-on state, cause the controller to:
automatically retrieve, via the NFC transceiver, configuration parameters stored in the NFC memory; and
automatically configure the controller using the retrieved configuration parameters.

13. The controller of claim 12,
wherein the NFC memory further stores one or more default configuration parameters of the controller.

14. The controller of claim 12,
wherein the configuration parameters stored in the NFC memory are stored in the NFC memory in an encrypted state after encryption via a symmetric key.

15. The controller of claim 14,
wherein the computer-readable memory of the controller is further encoded with instructions that, when executed by the one or more processors, cause the controller to decrypt the configuration parameters stored in the NFC memory using the symmetric key.

16. The controller of claim 15,
wherein the computer-readable memory of the controller is further encoded with instructions that, when executed by the one or more processors, cause the controller to derive the symmetric key using the identity information corresponding to the controller.

17. A method of configuring a controller, the method comprising:
storing, in memory of a Near Field Communication (NFC) tag associated with the controller, identity information and encrypted configuration parameters corresponding to the controller while the controller is in a powered-off state;
automatically retrieving, by the controller after transition of the controller from the powered-off state to a powered-on state, the encrypted configuration parameters stored in the memory of the NFC tag;
generating, by the controller, a symmetric key based on the identity information corresponding to the controller;
decrypting, by the controller using the symmetric key, the encrypted configuration parameters retrieved from the memory of the NFC tag to produce decrypted configuration parameters; and
automatically configuring the controller according to the decrypted configuration parameters.

* * * * *